Figures 1, 7:
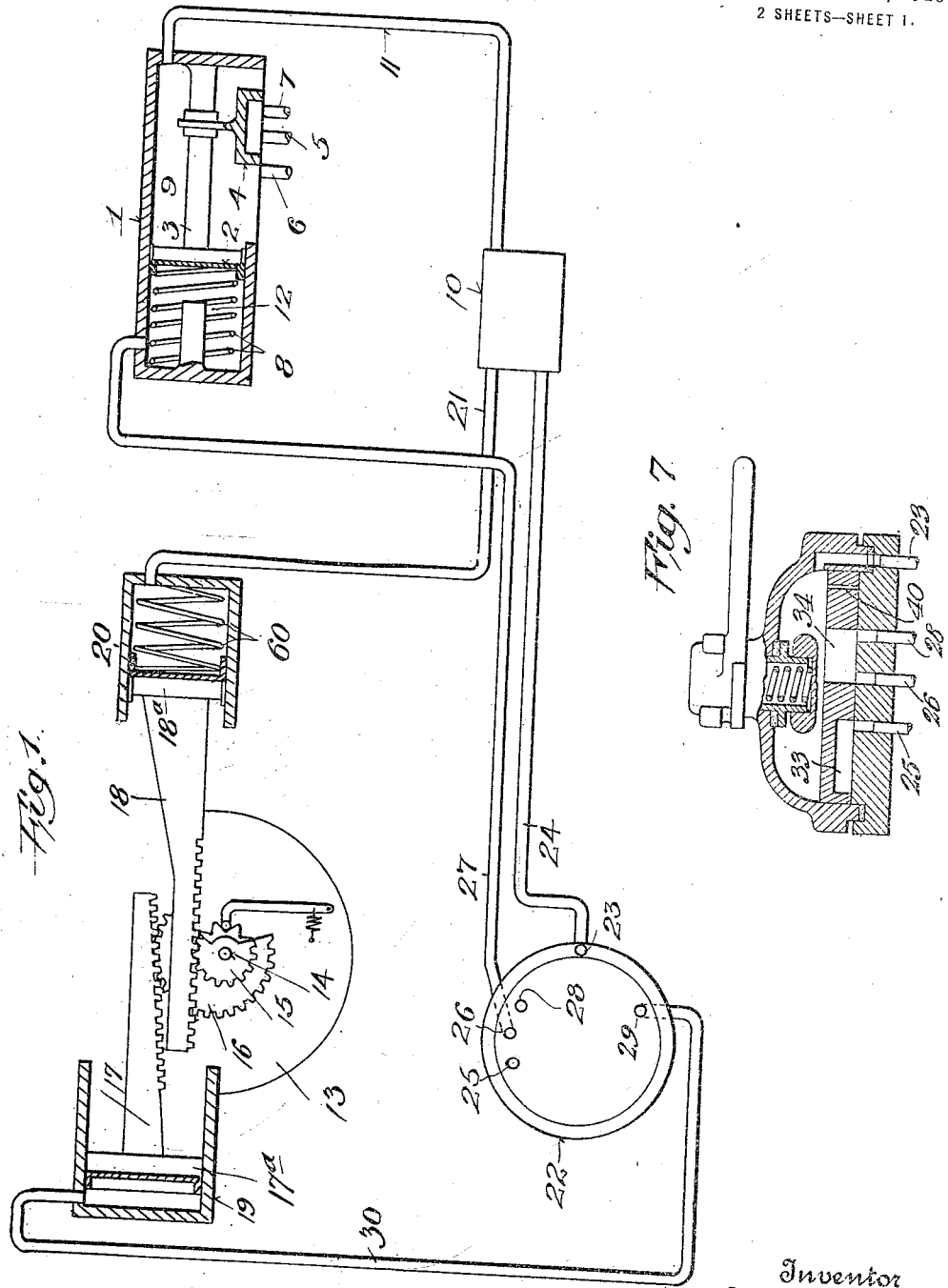

H. ROWNTREE.
CAR CONTROL DEVICE.
APPLICATION FILED NOV. 15, 1916.

1,297,498.

Patented Mar. 18, 1919.
2 SHEETS—SHEET 1.

Inventor
Harold Rowntree
By his Attorney
Samuel R. Wark

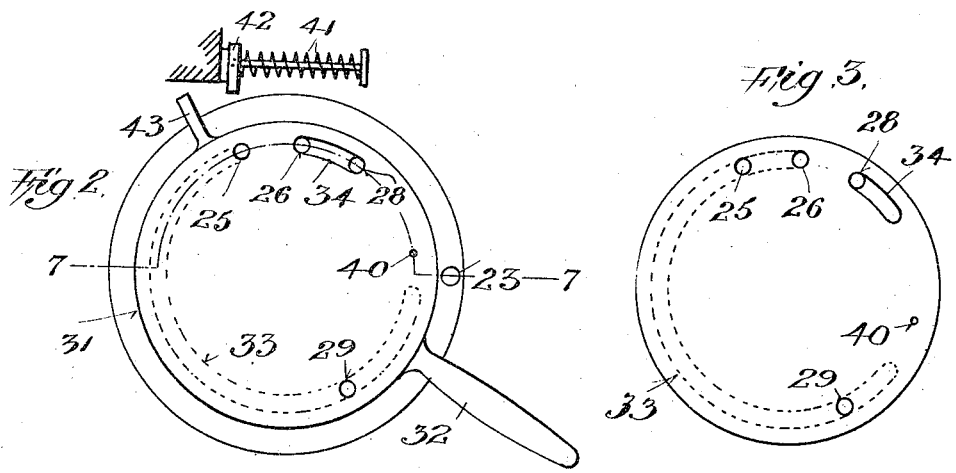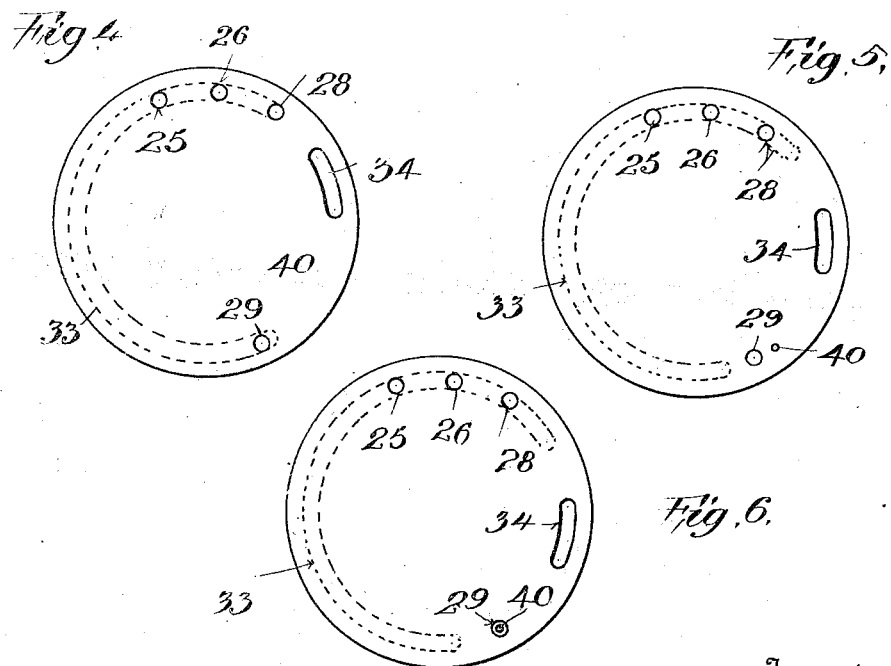

UNITED STATES PATENT OFFICE.

HAROLD ROWNTREE, OF KENILWORTH, ILLINOIS, ASSIGNOR, BY MESNE ASSIGNMENTS, TO THE WESTINGHOUSE AIR BRAKE COMPANY, OF WILMERDING, PENNSYLVANIA, A CORPORATION OF PENNSYLVANIA.

CAR-CONTROL DEVICE.

1,297,498. Specification of Letters Patent. Patented Mar. 18, 1919.

Application filed November 15, 1916. Serial No. 131,450.

*To all whom it may concern:*

Be it known that I, HAROLD ROWNTREE, a citizen of the United States, residing at Kenilworth, county of Cook, State of Illinois, have made a certain new and useful Invention in Car-Control Devices, of which the following is a specification.

This invention relates to car control devices, and more particularly to a combination controller for air brake, car motor and car door.

The object of the invention is to provide a car control device which is simple in construction and efficient in operation and wherein the entire operation of the car, that is, the motor, brakes and door operating mechanism, is controlled from a single control handle.

A further object of the invention is to provide a fluid pressure control of the motor controller.

A further object of the invention is to provide a device of the character described especially adapted for use in "one-man" cars, wherein the complete control of the car and its operating parts are controlled at one point.

A further object of the invention is to provide a pneumatically controlled car, that is, a car of which the motor, brakes and doors are pneumatically operated, with a single control valve which may be positioned at any desired point on the car.

A still further object of the invention is to provide a device of the character described having safety features incorporated therein to prevent accidental misuse of the device.

Further objects of the invention will appear more fully hereinafter.

The invention consists substantially in the construction, combination, location and relative arrangement of parts, all as will be more fully hereinafter set forth, as shown by the accompanying drawings, and finally pointed out in the appended claims.

In the accompanying drawings, Figure 1 is a diagrammatic view, partly in section, of a car control equipment embodying my invention; Fig. 2 a plan view of the controlling valve seat with the rotary valve in position for applying the brakes, opening the car door, and for effecting the movement of the motor controller to off position; Figs. 3 to 6, similar views, showing the rotary valve in its other operating positions; and Fig. 7 a section of the controlling valve on the line 7—7 of Fig. 2.

It is among the special purposes of my present invention to provide means for the fluid pressure operation of the car motor controller in addition to fluid pressure control of the brakes and door operating devices, and to control the operation of the controller, the brakes and the door operating devices with a single valve.

In carrying out my invention I provide means for preventing the operation of the motor controller when either the brakes or the door operating devices are operated. I also provide means for insuring the releasing of the brakes, and the operation of the door operating devices to close the doors before the control of the motor controller is effected. I also provide means for preventing the motorman from "slashing" the controller from the off to the full-on position, so practically short-circuiting the motor. Under my invention the controller is moved from point to point, at the maximum speed consistent with entire safety, that is, there is a time limit to feeding up the controller which cannot be exceeded.

I also provide what I call a "dead-man" feature, that is, the handle of the control valve operates against a spring when it is in a position that puts the motor controller in running position and the moment the motorman's hand is released from the control handle, the spring returns the control handle to the point where it not only causes the motor controller to return to "off" position but also applies the brakes, as will be hereinafter set forth.

In accordance with my invention, I employ the usual fluid pressure brake operating mechanism, not shown, as the particular structure thereof forms no part of the present invention. I also employ a well-known type of door operating engine not shown for the same reason. The control valve of the motor may be of any desired type, but for the purposes of illustration I have shown one form of door engine valve comprising a chest 1 in which operates a tight fitting piston 2. Secured to the rod 3 of the piston to move therewith, is a valve 4 which establishes communication between the port 6, or the port 7 and the interior of the chest 1 and so with the pressure supply pipe 11, and at the same time establishes communication between ports 5 and 7, or the ports 5 and 6, thereby opening the other side of the door engine to the exhaust, to either open or close the door. A spring 8 interposed between the piston 2 and the end of the casing 1 causes the operation of the opening action of the valve. The chamber 9 on the right of the piston 2 is at all times in communication with the source of fluid pressure 10 through suitable connection 11. The chamber 12 on the opposite side of the piston 2 is in communication with the common control valve to be more fully hereinafter described. It will be seen, from the foregoing, that under normal conditions, the pressure in chamber 9 will cause the piston 2 to be forced toward the left in the form opposite to that shown, so that port 6 is in communication with exhaust port 5, and fluid pressure is admitted through the port 7 to the cylinder of the engine to maintain the door closed. When, however, pressure is admitted to chamber 12, the pressure on both sides of the piston 2 is equalized and the spring 8 causes the piston and valve 4 to move to open port 7 in communication with the exhaust 5, and to place port 6 into communication with the fluid pressure in chamber 9 so that the engine is operated to open the car door.

I show a simple arrangement to effect the pneumatic control of the motor controller, wherein 13 designates generally the controller of any desired type of form, preferably of the type of rotative control. This controller need not be placed on the car platform in the position heretofore considered essential on account of its having been necessary to be in convenient relation to the motorman, as under my invention the car controller is not operated manually but is operated pneumatically and therefore it is only necessary to have the main control valve convenient to the motorman and the motor controller and its operating mechanism can be placed in any part of the car where there may be room for it, thereby relieving the front platform and making greater space for the entrance and exit of passengers, an advantage that is particularly appreciated in the "one-man" cars. On shaft 14 of the controller I mount two pinions, 15 and 16, pinion 15 engaging with the rack 18 and pinion 16 engaging with the rack 17. Pinion 16 is a differential pinion or an eccentric pinion and the face of the rack is proportioned accordingly. The rack 18 is connected to a piston 18ª that operates in cylinder 20 and rack 17 is connected to a piston 17ª that operates in the cylinder 19. The cylinder 19 is connected by the pressure pipe 30 with a main control valve and the cylinder 20 is connected by pipe 21 with the source of pressure supply. It will be noticed on the drawing that cylinder 19 is made of larger diameter than the cylinder 20 and is also given a somewhat larger stroke, due to the larger average diameter of the pinion 16 over the pinion 15. It will be noticed also that there is a spring 60 inside the cylinder 20 which can be used if desired.

If now fluid under pressure is admitted from the source of pressure supply to cylinder 20 then the controller shaft 14 through its pinion and rack connections, will be held in its extreme "off" position. If now pressure is slowly admitted to cylinder 19 so that it gradually builds up in cylinder 19, there will come a point when the pressure in cylinder 19, in its action on controller shaft 14, begins to overcome the opposing pressure in cylinder 20 the air pressure therein and the spring therein. After the pistons and racks have moved a short distance, they will attain a position of equilibrium, due partly to the decreased leverage of the eccentric pinion 16 as the part of the pinion that is engaging the rack more nearly approaches the size of the pinion 15, and due partly on account of the increased power necessary to further compress the spring in cylinder 20. It will be seen therefore that any given pressure in cylinder 19, assuming that there is a constant pressure in cylinder 20, will produce a definite relative position of controller shaft 14 so that if a certain amount of air is admitted to cylinder 19 and then the supply shut off but not exhausted, the controller 14 will reach and maintain a said certain definite intermediate position.

It is desirable that these various intermediate positions should correspond to the running points or notches on the controller brushes, and in order to insure this I provide the controller with the usual cam and pawl now used on the manually operated controller, and its action is to tend to retard the movement of the controller away from the contact point by imposing additional work to be done, and then by means of the star surface of the cam assisting the motion of the controller to the next definite running point. In this way the action of the pneumatic cylinders and their connecting racks and pinions is always operating the controller on its contact points.

It will be noted that either the action of the differential pinion or the action of the spring in cylinder 20 would tend to cause the controller shaft 14 to take a certain definite position in relation to the pressure in the cylinder 19. It is therefore not necessary to use both the differential pinion and the spring although it is advisable to do so, indeed the operation would be possible without either as if the supply pipe 30 was shut off the expansion of the air in cylinder 19, if the piston tried to move farther, or the compression if the piston tried to move backward, would practically hold controller shaft 14 to a definite position. Furthermore it is not necessary that cylinder 19 should be both larger and have a greater stroke than cylinder 20 as either one or the other would give the desired result, but I have shown these different forms as either one or the other or both can be profitably employed.

I show one form of single valve control for the operation of all of the operative parts of the car, but it will be understood that my broad invention, as defined by the claims is not to be limited to the structure shown, as many other types and forms may be employed to accomplish the results of my invention. In the form shown, as one embodiment of my invention I provide a valve seat 22 provided with a port 23 in constant communication with the source of fluid pressure supply 10 through suitable connection 24. The seat 22 is provided with an exhaust port 25, a port 26 in communication with the chamber 12 of the door engine control, valve 1 through suitable connection 27, a port 28 in communication with the fluid pressure actuated brake, not shown, and a port 29 connected to the cylinder 19 of the differential piston motor controlling the car motor controller 13, through suitable connection 30. The valve 31 which operates on the seat 22, and is turned by any suitable means, for example, by the handle 32, is provided with two passages 33 and 34, the passage 34 being in communication, with the interior of the valve chest and therefore with the fluid pressure supply port 23 and the passage 33 is always in communication with the exhaust port 25. I have diagrammatically illustrated the various positions of the valve with respect to the respective ports 25, 26, 28 and 29, in the operative positions of the valve within its limits. In the first position, as shown in Fig. 2, of the valve it will be seen that the passage 33 thereof establishes communication between the port 29 and the exhaust 25, and therefore, the motor controller is in its "off" position, and is held in that position by the pressure on the piston 18 of cylinder 20. At the same time the passage 34 admits fluid pressure from port 23 through passage 34 to both of the ports 26 and 28 with the result that the brakes are in application, and pressure flows through connection 27 to chamber 12 of the valve 1 and the spring in chamber 12 holds the valve in the position shown so that fluid pressure passes through port 6 to maintain the door in its open position. The rotation of the valve 31 clockwise to its next position, as indicated by the "second position", Fig. 3, still keeps the port 29 in communication with exhaust port 25 through passage 33, and also opens communication between port 26 and the exhaust so that the door is closed as above explained, and the supply port 23 is still in communication with the brake port 28 to maintain the brakes applied. Further clockwise rotation of the valve 31 into its third position, Fig. 4, places all of the respective operative ports in communication with exhaust with the result that the brakes are released and the doors are all closed, but no power is on. Further movement of the valve 31 to its final position Fig. 6, does not affect the ports 25, 26, and 28 but places the small fluid pressure supply port 40 in communication with the controller port 29 and thence to the cylinder 19 to gradually turn the controller in its "on" condition. The car motors gradually get more current until the desired speed is attained, and then the valve 31 is turned as shown in Fig. 5, so that neither the supply passage 34 nor the exhaust passage 33 registers with the port 29. It is obvious that if desired, the port 40 may be retained in communication with port 29 until the maximum speed of the car is attained.

It is evident from the foregoing, that with but slight movement of the control handle 32, the motor controller is instantly turned to its "off" position and the brakes applied. It is also obvious that the brakes may be applied with or without opening the door, but at no time can the door be opened without the controller being in its "off" position, and the brakes applied.

Attached in connection with valve 31 and its handle 32 is a spring 41 which operates to hold the lug 42 in line with lug 43 on the valve 31. Valve 31 can be moved by the handle 32 freely in either direction between its positions 1 and 2 but any further motion of the valve 31 tends to compress spring 41 so if the hand is released from the control handle 32 the valve is automatically brought back to its second position. If therefore the motorman should fall dead or unconscious, for example, when the car is going down hill at full speed the moment his hand is released from the handle the valve will automatically assume position 2 thereby cutting off the power and applying the brakes.

It will be noticed also on account of the air being admitted to cylinder 19 through the small hole 40 that the time limit is brought into action and the controller 13 and its controller shaft 14 is only moved from one notch to the next with the time limit interval. This small hole, or port 40, can be so regulated in size that the motion of the car motor controller from "off" to "on" position will be only as fast as the safety of the motor will permit, while at the same time, due to the large and free exhaust the controller will be moved back to "off" position almost instantaneously.

With this device it will be seen therefore the possibility of accidents are largely eliminated. A reckless motorman can not burn out his motor through "slashing" the controller, he can not apply the brakes while the power is on, nor apply the power with the brakes set. If he falls dead or unconscious the power is shut off and the brakes applied.

It will be noticed that the entire control of the door engine, the brakes and the car motor controller is obtained by the use of only five small pipes connecting to the control valve, two being the supply and exhaust, and one each for the door engine, the brakes, and the car motor controller. This taken in conjunction with the possible removal of the car motor controller from the front platform furnishes an exceedingly compact and simple control arrangement on the front platform for the motorman.

While I have shown and described specific structures and arrangements as embodiments of my invention, it is to be clearly understood that I am not to be limited to these specific structures and arrangements as many changes in detail will readily occur to those skilled in the art without departing from the broad scope of my invention as defined in the claims. Therefore, what I claim as new and useful and of my own invention and desire to secure by Letters Patent is,—

1. In a car, the combination with a fluid pressure actuated door operating engine and a car motor controller, of a common valve for controlling said door engine and said car motor controller.

2. In a car, the combination with a fluid pressure actuated door operating engine and a car motor controller, of a common valve for controlling said door engine and said car motor controller, and means for preventing the operation of said door engine until said car motor controller is in its "off" position.

3. In a car, the combination with a fluid pressure actuated door operating engine and a car motor controller, of a common valve for controlling said door engine and said car motor controller, and means for preventing the operation of said door motor until said car motor controller is in its "off" position, and means for actuating said door engine to close the door before said car motor controller can be moved from its "off" position.

4. In a car, the combination with a fluid pressure actuated door operating engine and a car motor controller, of a common means for controlling said engine and said controller.

5. In a car, the combination with a fluid pressure actuated door operating engine and a car motor controller, of a common means for controlling said engine and said controller.

6. In a car, the combination with fluid pressure actuated brakes, door operating engine and motor controller, of a common means for controlling said brakes, door engine and controller.

7. In a car, the combination with fluid pressure actuated brakes, door operating engine and motor controller, of a common valve for controlling said brakes, door engine and controller.

8. In a car, the combination with fluid pressure actuated brakes, door operating engine and motor controller, of a common valve for controlling said brakes, door engine and controller, and means for preventing the operation of said door engine and the application of said brakes until the motor controller is in its "off" position.

9. In a car, the combination with fluid pressure actuated brakes, door operating engine and motor controller, of a common valve for controlling said brakes, door engine and controller, and means for actuating said door engine to close the door, and to release said brakes before said controller is moved from its "off" position.

10. In a car, the combination with a fluid pressure actuated door operating engine, and a car controller, of a common manually operated means for controlling said engine and said controller and means for automatically operating said controlling means to turn said controller to its "off" position and to operate said engine to open the door when the manual control of said controlling means is released.

11. In a car, the combination with a fluid pressure actuated door operating engine, and a car controller, of a common manually operated valve for controlling said engine and said controller, and means for automatically operating said valve to turn said controller to its "off" position and to operate said engine to open the door when the manual control of said valve is released.

12. In a car, the combination with fluid pressure actuated brakes and a car controller, of a common manually operated means for controlling said brakes and said controller, and means for automatically operating said controlling means to turn said controller to its "off" position and to apply said brakes when the manual control of said controlling means is released.

13. In a car, the combination with fluid pressure actuated brakes and a car controller, of a common manually operated valve for controlling said brakes and said controller, and means for automatically operating said valve to turn said controller to its "off" position and to apply said brakes when the manual control of said valve is released.

14. In a car, the combination with fluid pressure actuated brakes, door operating engine and car controller, of a common manually operated means for controlling said brakes, door engine and controller, and means for automatically operating said controlling means to turn said controller to its "off" position, to apply said brakes and to operate said engine to open said doors when the manual control of said controlling means is released.

15. In a car, the combination with fluid pressure actuated brakes, door operating engine and car controller, of a common manually operated valve for controlling said brakes, door engine and controller and means for automatically operating said valve to turn said controller to its "off" position and to apply said brakes and to operate said engine to open said doors when the manual control of said valve is released.

In testimony whereof I have hereunto set my hand in the presence of the subscribing witnesses, on this sixth day of November, A. D., 1916.

HAROLD ROWNTREE.

Witnesses:
HARRY ELLIS,
A. W. JONES.